(12) United States Patent
Wnukowski et al.

(10) Patent No.: US 11,523,622 B2
(45) Date of Patent: Dec. 13, 2022

(54) METHOD FOR ISOLATION OF PROTEIN FROM PLANT MATERIAL

(71) Applicant: NapiFeryn BioTech sp. z o.o, Lodz (PL)

(72) Inventors: Piotr Wnukowski, Delft (NL); Magdalena Kozlowska, Lodz (PL); Lukasz Stanczyk, Lodz (PL); Danuta Alina Rachwal, Ozorkow (PL)

(73) Assignee: NapiFeryn BioTech sp. z o.o, Lodz (PL)

( * ) Notice: Subject to any disclaimer, the term of this patent is extended or adjusted under 35 U.S.C. 154(b) by 267 days.

(21) Appl. No.: 16/629,624

(22) PCT Filed: Jul. 10, 2018

(86) PCT No.: PCT/EP2018/068638
§ 371 (c)(1),
(2) Date: Jan. 9, 2020

(87) PCT Pub. No.: WO2019/011904
PCT Pub. Date: Jan. 17, 2019

(65) Prior Publication Data
US 2021/0137134 A1 May 13, 2021

(30) Foreign Application Priority Data

Jul. 10, 2017 (NL) .................................. 2019207
Jul. 10, 2017 (PL) ................................... 422158

(51) Int. Cl.
*A23J 1/14* (2006.01)
*A23J 1/00* (2006.01)
*A23J 3/14* (2006.01)

(52) U.S. Cl.
CPC ............... *A23J 1/006* (2013.01); *A23J 1/142* (2013.01); *A23J 3/14* (2013.01)

(58) Field of Classification Search
CPC ............... A23J 1/006; A23J 1/142; A23J 3/14
USPC .................................................... 426/656
See application file for complete search history.

(56) References Cited

U.S. PATENT DOCUMENTS

| | | | |
|---|---|---|---|
| 3,018,280 | A | 1/1962 | Salzberg et al. |
| 4,219,469 | A | 8/1980 | Kadan et al. |
| 2007/0207254 | A1 | 9/2007 | Crank |
| 2015/0073127 | A1* | 3/2015 | Wnukowski ............ A23J 1/142 530/378 |

FOREIGN PATENT DOCUMENTS

| | | |
|---|---|---|
| EP | 1528068 A1 | 5/2005 |
| GB | 1570746 | 7/1980 |
| WO | 02/060273 A1 | 8/2002 |

(Continued)

*Primary Examiner* — Hamid R Badr
(74) *Attorney, Agent, or Firm* — N.V. Nederlandsch Octrooibureau

(57) ABSTRACT

The present invention concerns a process wherein native and functional protein isolates can be successfully obtained from plant material such as oilseeds, legumes and lentils. This can be achieved by a proper pre-treatment of the plant material, followed by a method of extracting proteins under mild and non-destructive conditions using an aqueous solvent, followed by fractionation, concentration and further purification using a novel combination of GRAS organic solvents.

25 Claims, 5 Drawing Sheets

(56) References Cited

FOREIGN PATENT DOCUMENTS

| | | | |
|---|---|---|---|
| WO | WO-02060273 A1 * | 8/2002 | ................ A23J 1/12 |
| WO | 2011/057407 A1 | 5/2011 | |
| WO | 2013/013949 A1 | 1/2013 | |
| WO | 2014/147068 A1 | 9/2014 | |

* cited by examiner

METHOD FOR ISOLATION OF PROTEIN FROM PLANT MATERIAL

FIELD OF THE INVENTION

The present invention relates to a process for the extraction, purification and isolation of proteins from plant materials such as oilseeds, to protein isolates and to protein isolates obtainable via said process. The invention further relates to the use of protein isolates and protein isolates obtainable via said process in food.

BACKGROUND OF THE INVENTION

There is an urgent need to provide the growing population of humans with food of adequate nutritional quality that is produced in a way that is not harmful to the environment and in a way that is feasible from an economic and technological point of view.

This need is expected to grow in the decades to come, because the global population of humans is estimated to reach more than 9 billion people by 2050.

Increasing the production of meat, in particular red meat, may not be the optimal way to solve this problem, as it is known that the farming industry is hugely responsible for negative effects on the environment in terms of the use of natural resources like arable land and water, the emission of greenhouse gases to the atmosphere and pollution of water streams with antibiotics, growth hormones, et cetera, and even for the unintentional dissemination of these potentially harmful substances in the food produced from livestock.

There is consensus among nutrition experts that human needs for protein intake could be better satisfied by consumption of proteins from plant material rather than from animal origin. However, the inherent problem with proteins originating from plant material is that, in their natural form of occurrence, like in seeds, legumes, fruits and grains, they are usually embedded in complex matrices comprising fibres, polysaccharides, fats, lipids, micronutrients and anti-nutritional factors, like phenolic compounds, phytates, et cetera. To be applied as ingredients in food formulations, these proteins need to be extracted from the source material and isolated in purified or at least in concentrated form. Moreover, in many food applications it is important that these proteins retain their native functional properties such as solubility, capability to form stable emulsions with fats and oils, capability to form stable foams, et cetera.

The prior art discloses processes wherein plant material is subjected to a sequence of steps encompassing the sequential use of aqueous and organic solvents to obtain protein isolates.

WO02/060273A1 deals with the extraction of proteins from a sunflower meal with water using stirring devices with subsequent precipitation of the soluble protein using ethanol.

WO2011/057407A1 discloses methods for obtaining protein concentrates and isolates from rapeseed/canola. A process is disclosed wherein ethanol is added to a protein mixture with water and wherein soluble proteins are precipitated from solution.

In WO2013/013949A1 a protein isolation process is disclosed for the isolation of protein from an oil cake comprising the steps of (a) extraction of proteins with an aqueous solution, (b) concentration, and (c) adding water-miscible organic solvent such as methanol, ethanol and acetone, to obtain a protein precipitate. Extraction of the proteins is carried out by providing a suspension of a crude vegetable protein source in water and stirring the suspension in an STR type of device. Isolation of the protein is achieved by drying of the precipitate from the mixture of water and water-miscible solvents.

SUMMARY OF THE INVENTION

While these aforementioned processes provide means to isolate and to purify proteins from anti-nutritional factors like phenolic compounds, they do not address the issue of removal of (high amounts of) apolar components and impurities such as oils, fats and lipids in the plant material, such as for example in oilseeds and cakes thereof. These impurities, when passed to the final protein isolate, will make the product less stable and more susceptible to deterioration upon storage. Higher fat content will also lower functional properties of the protein product such as solubility and capacity to form stable emulsions with fats.

It is an object of the invention to provide a process for the isolation of proteins from plant material, preferably raw plant material, in purified or at least in concentrated form, particularly from plant material containing considerable amounts of oils, fats and/or lipids.

It is a further object of the invention to provide a process for the isolation of proteins from said plant material in purified or at least in concentrated form, wherein the native functional properties of the proteins are retained during the process such that the resulting protein isolates are suitable for human consumption.

It is a still further object of the invention to provide an economically feasible process for the isolation of proteins from said plant material in purified or at least in concentrated form.

The present invention addresses the above objects by providing a scalable and economically viable process wherein native and functional protein isolates can be successfully obtained from plant material, preferably raw plant material, containing considerable amounts of oils, fats and/or lipids such as oilseeds, legumes and lentils. This can be achieved by a proper pre-treatment of the plant material, followed by a method of extracting proteins under mild and non-destructive conditions using an aqueous solvent, followed by fractionation, concentration and further purification using a novel combination of GRAS organic solvents. In other words, concentrates of proteins in aqueous solutions are prepared using techniques of extraction, fractionation and concentration known in the prior art followed by the replacement of the aqueous extraction solvent by at least two other solvents in a sequence of declining polarity of the subsequently applied solvents, whereby:

i) the main component of the first aqueous solvent used for the initial extraction step is thus water;
ii) the main component of the second solvent belongs to the group of alcohols having 1 to 5 carbon atoms being miscible with water at room temperature; and
iii) the main component of the third solvent is an apolar solvent belonging to the group of organic esters which are miscible with the second solvent but which are only partially miscible with the first solvent at room temperature.

Accordingly, a first aspect of the invention relates to a process for the preparation of a protein isolate from plant material, wherein said plant material comprises between 10 and 50 wt % on dry weight basis of proteins, said process comprising the steps of:

a) crushing or comminuting the plant material to produce a solid cake;
b) extracting the solid cake obtained in step a) using a first solvent comprising at least 90 wt % of water, based on the total weight of the first solvent, to obtain a mixture of a first solid fraction and a first liquid fraction;
c) separating the first liquid fraction from the first solid fraction;
d) preparing a protein concentrate from the first liquid fraction obtained in step c), wherein the protein concentrate comprises 50 to 90 wt % of water, based on the total weight of the protein concentrate, wherein protein is dissolved in the first solvent and/or wherein protein is present in a second solid fraction, wherein the protein content in the concentrate is at least 40 wt %, based on total dry weight of the concentrate;
e) adding a second solvent to the protein concentrate obtained in step d), wherein the second solvent comprises at least 90 wt % of an alcohol having 1 to 5 carbon atoms being miscible with water at room temperature, based on the total weight of the second solvent;
f) separating the mixture obtained in step e) into a second liquid fraction and a third solid fraction using a technique chosen from the group consisting of filtration, sedimentation, centrifugation and combinations thereof, wherein the protein content of the third solid fraction is at least 60 wt %, based on total dry weight of the third solid fraction;
g) adding a third solvent to the third solid fraction obtained in step f), said third solvent comprising at least 90 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is chosen such that the overall liquid phase does not separate into distinct liquid phases;
h) separating the mixture obtained in step g) into a third liquid fraction and a fourth solid fraction using a technique chosen from the group consisting of filtration, sedimentation, centrifugation and combinations thereof, wherein the protein content of the fourth solid fraction is at least 90 wt %, based on total dry weight of the fourth solid fraction;
i) subjecting the fourth solid fraction obtained in step h) to a technique chosen from the group consisting of vacuum drying, spray drying, superheated steam drying and combinations thereof, to obtain a protein isolate wherein the protein content is at least 90 wt %, based on total dry weight of the a protein isolate.

It is preferred that the plant material is raw plant material. The invention further relates to a protein isolate comprising at least 70 wt % of native plant-based protein based on dry matter, less than 1 wt % carbohydrates (simple sugars), less than 0.2 wt %, preferably less than 0.15 wt %, more preferably less than 0.1 wt % phenolic compounds and no organic or mineral solvents having 6 or more carbon atoms.

The invention also relates to a protein isolate obtainable by the process as defined hereinbefore.

In a still further aspect, the invention relates to the use of the protein isolate as defined hereinbefore, or obtainable by the process as defined hereinbefore, in food.

DEFINITIONS AND ABBREVIATIONS

Figure 1:
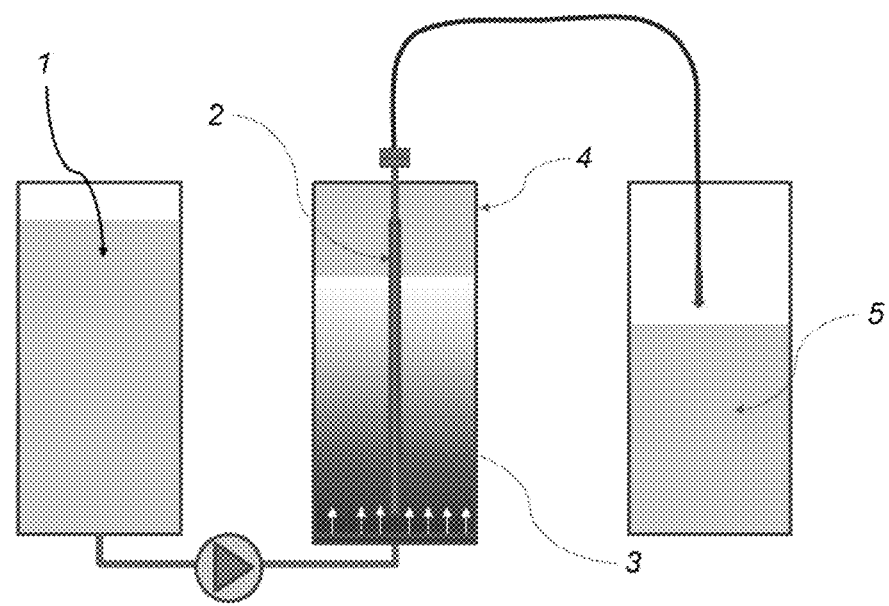
FIG. 1 depicts a schematic drawing of the ALSEOS 7L system used in the Examples, wherein (1) represents the first solvent, (2) represents a cylindrical filter element, 100 micrometer wiremesh, 0.1 m², (3) represents the comminuted source material, (4) represents the ALSEOS column, ID 0.1 m, H 1 m, and (5) represents the filtrate (=crude extract, =first liquid fraction).

The term 'meal' as used herein refers to plant material in powder form, such as flour, said plant material virtually devoid of oil and lipids by extraction of these oils and lipids with organic or mineral solvents such as hexane with subsequent removal of said solvents by toasting with water steam. The terms 'mineral solvent' as used herein refers to solvents derived from fossil deposits like petroleum or bituminous coal by processes of cracking, refinery and/or rectification. The term 'plant material' as used herein has its conventional meaning and refers to material derived from plants, encompassing vegetables, fruits, seeds, legumes and grains. The term 'raw plant material' as used herein has its conventional meaning and refers to crude plant material that can be converted by processing according to the present invention into a new and useful product such as protein isolate containing proteins originally present in the crude plant material. The term 'room temperature' as used herein is a temperature between 18 and 25° C.

The abbreviation 'GRAS solvents' stands for solvents that are 'Generally Regarded As Safe' and belong to Class 3 in accordance with: Guidance for Industry, Q3C—Tables and List, U.S. Department of Health and Human Services, Food and Drug Administration Center for Drug Evaluation and Research (CDER), Center for Biologics Evaluation and Research (CBER), February 2012, ICH, Revision 2. In this respect, reference is made to https://www.fda.gov/downloads/drugs/guidances/ucm073395.pdf.

The abbreviation 'TFF' stands for 'Tangential Flow Filtration'. The abbreviations 'EAI' and 'ESI' respectively stand for 'Emulsion Activity Index' and 'Emulsion Stability Index'. The abbreviation 'STR' stands for 'Stirred Tank Reactor'. The abbreviation 'ALSEOS' stands for 'Aqueous Low Shear Extraction of Oil Seeds'. The abbreviations 'CV', 'G', 'rpm', 'TMP', 'DW' and 'NS' respectively stand for 'Column Volume', 'Gravity', 'revolutions per minute', 'Transmembrane Pressure', 'Dry Weight' and 'Nitrogen Solubility'. The abbreviation 'EA' stands for ethyl acetate.

DETAILED DESCRIPTION OF THE INVENTION

In a first aspect, the invention provides a process for the preparation of a protein isolate from plant material, wherein said plant material comprises between 10 and 50 wt % on dry weight basis of proteins, said process comprising the steps of:
a) crushing or comminuting the plant material to produce a solid cake;
b) extracting the solid cake obtained in step a) using a first solvent comprising at least 90 wt % of water, based on the total weight of the first solvent, to obtain a mixture of a first solid fraction and a first liquid fraction;

c) separating the first liquid fraction from the first solid fraction;
d) preparing a protein concentrate from the first liquid fraction obtained in step c), wherein the protein concentrate comprises 50 to 90 wt % of water, based on the total weight of the protein concentrate, wherein protein is dissolved in the first solvent and/or wherein protein is present in a second solid fraction, wherein the protein content in the concentrate is at least 40 wt %, preferably at least 50 wt %, based on total dry weight of the concentrate;
e) adding a second solvent to the protein concentrate obtained in step d), wherein the second solvent comprises at least 90 wt % of an alcohol having 1 to 5 carbon atoms being miscible with water at room temperature, based on the total weight of the second solvent;
f) separating the mixture obtained in step e) into a second liquid fraction and a third solid fraction using a technique chosen from the group consisting of filtration, sedimentation, centrifugation and combinations thereof, wherein the protein content of the third solid fraction is at least 60 wt %, based on total dry weight of the third solid fraction;
g) adding a third solvent to the third solid fraction obtained in step f), said third solvent comprising at least 90 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is chosen such that the overall liquid phase does not separate into distinct liquid phases;
h) separating the mixture obtained in step g) into a third liquid fraction and a fourth solid fraction using a technique chosen from the group consisting of filtration, sedimentation, centrifugation and combinations thereof, wherein the protein content of the fourth solid fraction is at least 90 wt %, based on total dry weight of the fourth solid fraction;
i) subjecting the fourth solid fraction obtained in step h) to a technique chosen from the group consisting of vacuum drying, spray drying, superheated steam drying and combinations thereof to obtain a protein isolate wherein the protein content is at least 90 wt %, based on total dry weight of the a protein isolate.

Preferably, the plant material comprising between 10 and 50 wt % on dry weight basis of proteins is raw plant material. The plant material comprising between 10 and 50 wt % on dry weight basis of proteins is preferably selected from the group consisting of vegetables, fruits, seeds, legumes, grains and combinations thereof.

In a more preferred embodiment, the plant material comprising between 10 and 50 wt % on dry weight basis of proteins is selected from the group consisting of oilseeds, including rapeseed, canola, sunflower, safflower, and cottonseed, pulses, including soybeans and other beans, legumes and peas, including chickpea, red, green, yellow and brown lentils, and combinations thereof.

In an even more preferred embodiment, the plant material comprising between 10 and 50 wt % on dry weight basis of proteins is selected from the group consisting of oilseeds, including rapeseed, canola, sunflower seed, flaxseed, safflower seed, cottonseed and combinations thereof.

In a most preferred embodiment, the plant material comprising between 10 and 50 wt % on dry weight basis of proteins is rapeseed belonging to family *Brassica* and species *Brassica napus* or *Brassica juncea*.

Plant materials, and in particular raw plant materials, such as oilseeds like rapeseed, canola, sunflower, safflower, cottonseed, et cetera, pulses such as soybeans and other beans, legumes and peas such as chickpea, red, green, yellow and brown lentils, et cetera, share the common feature that a significant fraction of their native protein content belongs to the protein class called albumins and/or globulins, i.e. they are soluble in water and/or aqueous solutions of inorganic salts containing cations like $NH_4^+$, $Li^+$, $Na^+$, $K^+$, $Mg^{+2}$, $Ca^{+2}$ and/or anions like $Cl^-$, $SO_4^{-2}$, $SO_3^{-2}$, $HSO_3^-$, et cetera. Besides proteins, these plant materials typically also contain other types of compounds which are present in varying proportions depending on the type of plant material. Said other compounds typically are saccharides (poly-, oligo-, mono-), starch, phytates, phenolic compounds, fibrous components, non-protein nitrogen compounds, et cetera. One notable and distinct class of ingredients that may be present in the plant materials encompasses lipids such as fats, oils, phospholipids, glycolipids, et cetera, characterized by the common feature of having a non-polar part in their molecular structure composed of fatty acids having a number of carbon atoms within a range from 4 to 28.

The person skilled in art will understand that prior to processing according to the teaching of invention, plant material in the form of whole seeds, beans or grains may be subjected to preselection and/or dry fractionation like dehulling (i.e. removal of pods and outer coats of seeds). Such an operation may be particularly advantageous in case the protein content in the parts that can be removed by dry fractionation is significantly lower than the protein content in the parts that will be subjected to further processing with the aim of obtaining protein isolates.

Hence, in a preferred embodiment, the process as defined hereinbefore, wherein the plant material comprises whole seeds, beans or grains, comprises a step wherein the plant material is subjected to preselection and/or dry fractionation, preferably dehulling, prior to step a).

Typically, for oilseeds and soya, part of the fat, oil and lipids present in the plant material may be extracted from the plant material by mechanical means such as extrusion or cold pressing to produce oilseed cakes, or said fat, oil and lipids can be extracted by chemical means such as extraction in apolar and lipophilic solvents such as hexane. In conventional processes wherein hexane extraction is employed, steam and high temperatures are typically employed to remove residuals of hexane from the meal in a purposely designed desolventizer/toasting step. Such a treatment may have a negative impact on the quality of protein in the meal due to partial and irreversible denaturation of the protein present in the meal and loss of relevant functional properties, such as solubility and/or the ability to form stable emulsions with lipids.

In a preferred embodiment, the plant material is at least partially defatted prior to step a) using mechanical means, preferably using cold pressing. Preferably, neither organic nor mineral solvents are used in the defatting step using mechanical means.

The advantages of the process as defined hereinbefore are most pronounced if the plant material contains considerable amounts of fats, oils and/or lipids. Hence, in a preferred embodiment, the plant material comprises at least 5 wt %, more preferably at least 10 wt %, even more preferably at least 15 wt %, on dry weight basis of fats, oils and lipids.

In a very preferred embodiment, the plant material is not heated to temperatures higher than 75° C.

As indicated, crushing or comminuting of the plant material is performed. This is a necessary step to facilitate distribution and suspension of the plant material in the first aqueous solvent used for extraction. By doing so, the conditions for effective mass transfer between crushed or comminuted plant material and the first solvent used for extraction are facilitated.

In a preferred embodiment, the first solvent in step b) is water or an aqueous solution comprising salts and optionally comprising further additives.

Extracting protein from the crushed or comminuted plant material to the first solvent may be accomplished by any technique suitable for facilitating mass transfer between the suspended or dispersed solid phase and the continuous liquid phase of the first solvent such as:
a) mixing in a STR;
b) contacting the crushed or comminuted plant material, being immobilized as a packed bed, with a first solvent percolating through the packed bed;
c) contacting the crushed or comminuted plant material by suspending it in an upward flowing first solvent; or
d) contacting the crushed or comminuted plant material with the first solvent by allowing the material to settle in the first solvent due to the action of forces of gravity and/or centrifugal forces.

The person skilled in art appreciates that all these means and mechanisms of contacting crushed or comminuted plant material with the first solvent can be divided into two distinct classes characterised by the amount of shear that is generated in the contacting device. In the low shear mode of operation, like in a packed bed, an expanded bed or a fluidized bed, or during gravitational settling, shear forces and velocity gradients in the contacting devices are on such a low level that the integrity of the crushed or comminuted plant material is substantially preserved and mass transfer between crushed or comminuted plant material and first solvent is governed mainly by diffusion of soluble components from the crushed or comminuted plant material into the stagnant or gently flowing first solvent, while non-soluble components like fibres and lipids are mainly left intact and are arrested in the solid matrix. In contrast, when a high shear mode of operation is employed, like in an STR, where shear rates due to agitation may well exceed 100 1/s, especially in the vicinity of the agitator, integrity of the crushed or comminuted plant material will generally not be preserved, due to disruptive effects of velocity gradients and or turbulence generated by the stirring device. In effect, particles of the crushed or comminuted plant material may become subjected to fragmentation with subsequent release of the constituent components like fines and lipids into the liquid phase. Release of these fines and lipids may have negative impact on the process further downstream of the extraction step. Coextraction of proteins and lipids in the high-shear devices may also lead to formation of microemulsions wherein proteins, lipids, solid fines and anti-nutritional factors will become entrapped in grease-like amorphous bodies, posing severe problems for the processor and making the process of fractionation, purification and isolation of protein unfeasible. Hence, in a preferred embodiment, the extraction of proteins in step b) is performed under low-shear conditions.

The extraction of proteins from crushed or comminuted plant material suspended or dispersed in the first solvent can be conducted in a batch-wise, semi-continuous or fully continuous mode of operation. Given sufficient amount of contacting time, typically 2-8 h, more preferably 4-6 h, a significant portion of proteins will be released from the crushed or comminuted plant material and will dissolve into the first solvent, yielding the first liquid fraction (also called 'crude extract') and the first solid fraction containing residual material that has not been solubilized.

The first liquid fraction can be separated from the first solid fraction by means of a technique chosen from the group consisting of filtration, sedimentation, centrifugation and combinations thereof.

Optionally, the first liquid fraction, after separation from first solid fraction, may be subjected to another solid-liquid separation step using filtration devices like self-cleaning filters or depth filters or the first liquid fraction may be subjected to centrifugation in disc-stack centrifuges or similar devices, with the aim of removing solid fines and/or lipids that may be present in the first liquid phase. Such an intermediate liquid phase obtained from the first liquid fraction is called a 'clarified extract'.

As defined hereinbefore, the first liquid fraction in the form of the crude extract or the clarified extract is subjected in step d) to a concentration step in order to prepare a protein concentrate. This concentration step preferably comprises ultrafiltration, evaporation or a combination thereof. In one embodiment of the invention, the first liquid fraction is subjected in step d) to ultrafiltration in a TFF device with a filtration membrane of the hollow fibre type, a ceramic membrane or a spiral-wound membrane, said filtration membrane having an opening size (cut off size) small enough to retain proteinaceous matter of typically 6-20 kD present in the first liquid phase, while being permeable to other solutes like peptides, polysaccharides, oligosaccharides, sugars, phenolic compounds, phytates and salts being present in the first liquid fraction. After this ultrafiltration concentration step, preferably a diafiltration step of the concentrate (the ultrafiltration retentate) with fresh water or with an aqueous solution comprising salts optionally comprising further additives is employed to produce a protein concentrate of improved purity, said concentrate comprising at least 10 wt % solids either dissolved or precipitated, wherein the protein content in the protein concentrate is at least 40 wt %, preferably at least 50 wt %, based on total dry weight of the concentrate, and wherein the protein concentrate comprises 50 to 90 wt % of water, based on the total weight of the protein concentrate.

The person skilled in art will understand that processing of the first liquid fraction in a TFF loop into a protein concentrate may induce precipitation of a second solid fraction due to concentration effects, effects of pH or effects due to a change in ionic strength. If this happens, this second solid fraction, containing more than 40% protein on dry weight basis, may be added to the protein concentrate of the first liquid fraction. This protein concentrate will thereafter be processed according to the invention to yield protein isolates. Optionally, the protein concentrate obtained in step d) is subjected to evaporation under vacuum in order to remove an excess of water.

The person skilled in art will understand that the second solid fraction may be alternatively prepared from the first liquid fraction by changing the pH or the ionic strength of the first liquid fraction, even prior to a TFF step, whereby larger proteins belonging to the globulin class will precipitate, while smaller proteins belonging to the albumin class will remain in solution. The second solid fraction comprising mostly globulin protein could be subsequently separated from the first liquid fraction by suitable techniques like filtration, sedimentation or, preferably, centrifugation, yielding a wet cake of the second solid fraction and a supernatant of the first liquid fraction. Also in this case, the protein content in the second solid fraction after solid liquid separation will be more than 40 wt % on dry weight basis and the water content in the wet cake of the second solid fraction will be in the range of 50 to 90 wt %. The wet cake of the second solid fraction may be subsequently processed according to the invention to yield protein isolates.

The second solvent that is added to the protein concentrate obtained in step d) comprises at least 90 wt % of an alcohol having 1 to 5 carbon atoms which is miscible with water at room temperature, based on the total weight of the second solvent.

In a preferred embodiment, the alcohol having 1 to 5 carbon atoms which is miscible with water at room temperature has a relative polarity between 0.8 and 0.4. Values of relative polarity for various solvents are disclosed in: *Solvents and Solvent Effects in Organic Chemistry*, Wiley-VCH Publishers, 3$^{rd}$ ed., 2003, which is incorporated herein by reference. Water has a relative polarity of 1.

In a more preferred embodiment, the alcohol having 1 to 5 carbon atoms which is miscible with water at room temperature is chosen from the group consisting of methanol, ethanol, propanol, iso-propanol, butanol, iso-butanol, and combinations thereof. Addition of the second solvent will have an effect on the polarity of the liquid phase and may alter solubility of the proteins, thereby inducing precipitation of the protein, and may also alter the nature of interactions between proteins and other components and impurities such as saccharides, phenolic compounds and/or isoflavones in such a way that these impurities can dissociate from the proteins and can be removed from the protein isolates in subsequent solid-liquid separation steps. Thus, the addition of the second solvent and the replacement of the first solvent may facilitate efficient isolation of proteins as well as purification of the protein isolate from impurities otherwise associated with said protein in its native form, which impurities are not amenable to removal while protein is dissolved or precipitated in the first (aqueous) solvent. As the object of the invention is the provision of protein isolates for application in human food, the choice of suitable second solvents is dictated by functionality as well as by health and safety concerns. Due to the above-mentioned constraints, the most preferred choice of the alcohol having 1 to 5 carbon atoms which is miscible with water at room temperature is ethanol. Ethanol is commonly used in the food industry and is recognized as a GRAS solvent.

The amount of the second solvent used in step e) of the process will be dictated by the degree of concentration of the protein in the first solvent, the solubility of the protein in the mixture of the first solvent and the second solvent and by denaturation effects related to the second solvent. In a preferred embodiment, the amount of second solvent will be such as to reach a weight ratio of the first solvent to the second solvent between 1:10 and 1:1, preferably between 1:3 and 2:3.

After the addition of the second solvent, a mixture is created wherein protein is mainly present as a precipitated solid fraction and wherein soluble compounds such as saccharides, phenolic compounds, isoflavones and other impurities are found in the liquid phase. Fats and lipids, if present, will be mainly associated with the solid fraction.

The solid fraction is isolated in step f) from the mixture using a technique chosen from the group consisting of filtration, sedimentation, centrifugation and combinations thereof, to obtain a third solid fraction and a second liquid fraction wherein the protein content of the third solid fraction is at least 60 wt %, based on total dry weight of the third solid fraction. As will be appreciated by the skilled person, the third solid fraction comprises traces of solvents used in the process such as water and the water-miscible alcohol. The third solid fraction may also contain residues of fats and lipids that were coextracted with the protein and that were not removed in other steps of the process.

The person skilled in art will further understand that after isolation of the third solid fraction, in order to further improve purity of the protein isolate, additional washing steps can be employed, whereby fresh portions of the second solvent or a mixture of the second solvent and water can be added to the third solid fraction, followed by suitable solid-liquid separation steps chosen from the group consisting of filtration, sedimentation, centrifugation and combinations thereof.

The third solvent added in step g) comprises at least 90 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is preferably chosen such that the overall liquid phase does not separate into distinct liquid phases. In a preferred embodiment, the amount of third solvent will be such as to reach a weight ratio of the second solvent to the third solvent between 1:10 and 1:1, preferably between 1:5 and 1:2. Addition of the third solvent will have an effect on polarity of the liquid phase and will alter the solubility of oils, fats and lipids and may also alter the nature of interactions between proteins and non-polar impurities in such way that they can dissociate from proteins and can be removed in subsequent solid-liquid separation steps. Thus, the addition of the third solvent and the replacement of the first and the second solvent facilitates efficient isolation of proteins as well as the purification of the protein isolate from impurities otherwise associated with said protein in its native form which impurities are not amenable to removal, while the protein is dissolved or precipitated in the first and/or second solvent.

In a preferred embodiment, the apolar and lipophilic organic ester having up to 5 carbon atoms that is at least partially miscible with the first solvent and fully miscible with the second solvent at room temperature has a relative polarity of less than 0.4.

As the object of the invention is the provision of protein isolates for application in human food, the choice of the suitable third solvent is dictated by functionality as well as by health and safety concerns. Due to these constraints, the most preferred choice of this apolar solvent is ethyl acetate. Ethyl acetate in commonly used in the food industry and is recognized as a GRAS solvent.

The solid-liquid mixture obtained in step g) is separated into a third liquid fraction and a fourth solid fraction using filtration, sedimentation or centrifugation. Due to removal of lipids and other apolar impurities by the action of the third solvent, the purity of the protein is further improved and, consequently, the protein content of the fourth solid fraction exceeds 90 wt %, based on total dry weight of the fourth solid fraction.

The person skilled in the art will understand that after isolation of the fourth solid fraction, in order to further improve purity and or to further remove residues of the first and second solvents from the fourth solid fraction, additional washing steps can be employed, whereby fresh portions of the third solvent can be added to the fourth solid fraction, followed by suitable solid-liquid separation steps chosen from the group consisting of filtration, sedimentation, centrifugation and combinations thereof.

The fourth solid fraction, which is protein isolate soaked in the third solvent, is subjected in step i) to a technique chosen from the group consisting of vacuum drying, spray drying, superheated steam drying and combinations thereof, to obtain a protein isolate wherein the protein content is at least 90 wt %, based on total dry weight of the a protein isolate.

In a preferred embodiment, the residual amount of the third solvent in the protein isolate obtained in step i) is below the acceptable level required by food authorities, typically below 1000 ppm, preferably below 100 ppm, even more preferably below 20 ppm.

An advantage of using the third solvent as defined hereinbefore, such as ethyl acetate, is its high volatility and low latent heat of evaporation (368 kJ/kg), which is significantly lower than that of water (2260 kJ/kg) and ethanol (841 kJ/kg), which implies that a lower amount of energy will be required to remove residues of solvents used in the process and that temperatures to which the protein is exposed during drying can be lowered as compared to the processes where only a first solvent or a second solvent or a combination thereof is used. Proteins are known to be sensitive to the effects of high temperatures and can, for example, be severely denaturized during spray drying. As an example, it is reported that up to 70% of whey protein may be denatured during spray drying. In this respect, reference is made to Md. Amdadul Haque, 2015, *Drying and Denaturation of Proteins in Spray Drying Process*, https://www.researchgate.net/publication/275100415.

Yet another advantage of replacing the first and second solvent with the third solvent is the low degree of denaturation of plant proteins in the apolar, lipophilic solvents such as esters like ethyl acetate, even at high temperatures. In this respect, reference is made to D. Fukushima, 1969, *Denaturation of soy proteins by organic solvents*, http://www.aaccnet.org/publications/cc/backissues/1969/Documents/Chem46_156.pdf.

The use of lipophilic GRAS solvents, such as ethyl acetate, to remove residues of fats and lipids from protein isolates brings additional advantage in that it makes the use of noxious solvents derived from mineral oils such as hexane obsolete in the process of producing food grade protein isolates from plant material, such as oilseeds. This also implies elimination of conventional steps that are currently employed by the industry to remove residues of hexane from the meals, said steps typically involving use of steam and high temperatures, which steps significantly limit the extractability and functionality of the proteins present in the meal.

In a very preferred embodiment, the solvents used in the process as defined hereinbefore substantially consist of GRAS solvents.

In another very preferred embodiment, the process as defined hereinbefore is performed without using organic or mineral solvents having 6 or more carbon atoms, such as hexane.

The process of the invention does not require the use of extreme conditions such as high temperatures or major shifts of the pH. Rather to the contrary, temperatures to which the proteins are exposed throughout the process are preferably kept in the range between 0 to 50° C., more preferably between 10 to 20° C., and the pH is preferably kept in the range between 5 and 8.

In a preferred embodiment, the protein isolate obtained in step i) of the process as defined hereinbefore comprises at least 95 wt % of plant-based protein based on dry matter.

In another preferred embodiment, the protein isolate obtained in step i) of the process as defined hereinbefore comprises at least 95 wt % of plant-based protein based on dry matter, exhibits a nitrogen solubility (NS) of more than 75% and an emulsion forming capacity, expressed as Emulsion Activity Index (EAI), of more than 20 $m^2/g$.

In still another preferred embodiment, the protein isolate obtained in step i) of the process as defined hereinbefore comprises at least 70 wt % of native plant-based protein based on dry matter.

In a second aspect of the invention a protein isolate is provided comprising at least 70 wt % of native plant-based protein based on dry matter, less than 1 wt % carbohydrates (simple sugars), less than 0.2 wt %, preferably less than 0.15 wt %, more preferably less than 0.1 wt % phenolic compounds and no organic or mineral solvents having 6 or more carbon atoms.

In a preferred embodiment, the protein isolate comprises at least 95 wt % of plant-based protein based on dry matter, exhibits a nitrogen solubility (NS) of more than 75% and an emulsion forming capacity, expressed as Emulsion Activity Index (EAI), of more than 20 $m^2/g$.

In a third aspect of the invention, a protein isolate obtainable by the process as defined hereinbefore is provided.

In a preferred embodiment, the protein isolate as defined hereinbefore or the protein isolate obtainable by the process as defined hereinbefore comprises less than 2 wt %, preferably less than 1.5 wt %, more preferably less than 1 wt % of fats, oils and lipids, based on dry matter.

In a fourth aspect, the invention relates to the use of the protein isolate as defined hereinbefore or the protein isolate obtainable by the process as defined hereinbefore in food.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Example 1

Three runs (1a, 1b and 1c) wherein protein isolates were prepared from rapeseed meals were performed.

In run 1a, a self-prepared, low-temperature toasted, rapeseed meal was used. This rapeseed meal was prepared by degreasing, drying and toasting a rapeseed cake which was cold-pressed at a process temperature <70° C. The rapeseed cake was obtained from Grupa Wilmar Marek Wilczyński SKA. Degreasing was performed with hexane at 70° C. in a Soxhlet apparatus. After degreasing, the rapeseed was dried at RT for 16 hours. In a next step, the dried rapeseed was toasted with steam at 90° C. (temperature of the material) for 1 hour and then dried at 60° C. during 24 h.

In run 1b, a rapeseed cake which was cold-pressed at a process temperature <70° C., obtained from Grupa Wilmar Marek Wilczyński SKA, was used.

In run 1c, a commercial high-temperature (about 130° C.) toasted rapeseed meal, acquired from an external supplier, was used.

Figure 2:
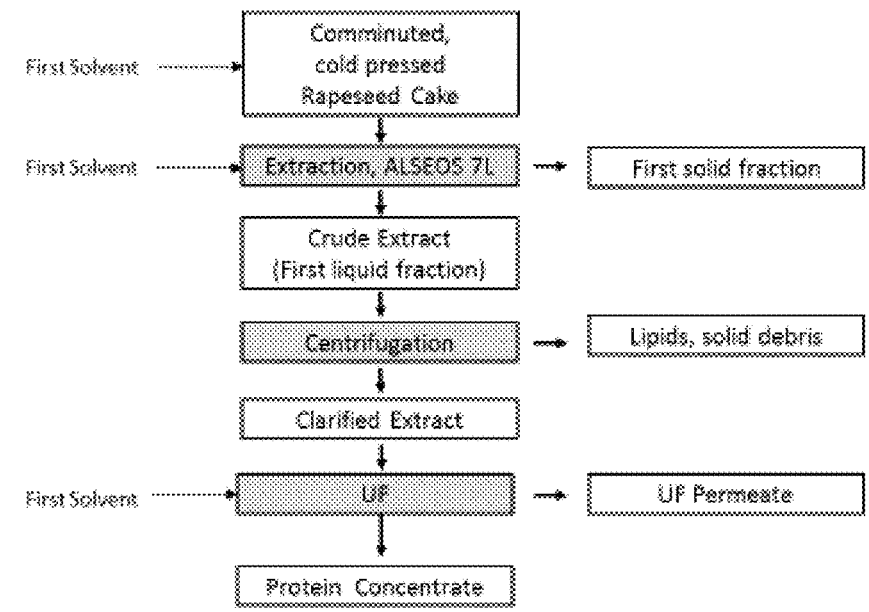
FIG. 2 depicts a schematic diagram of the process of the invention as described in Examples 1 and 2.
Figure 2:
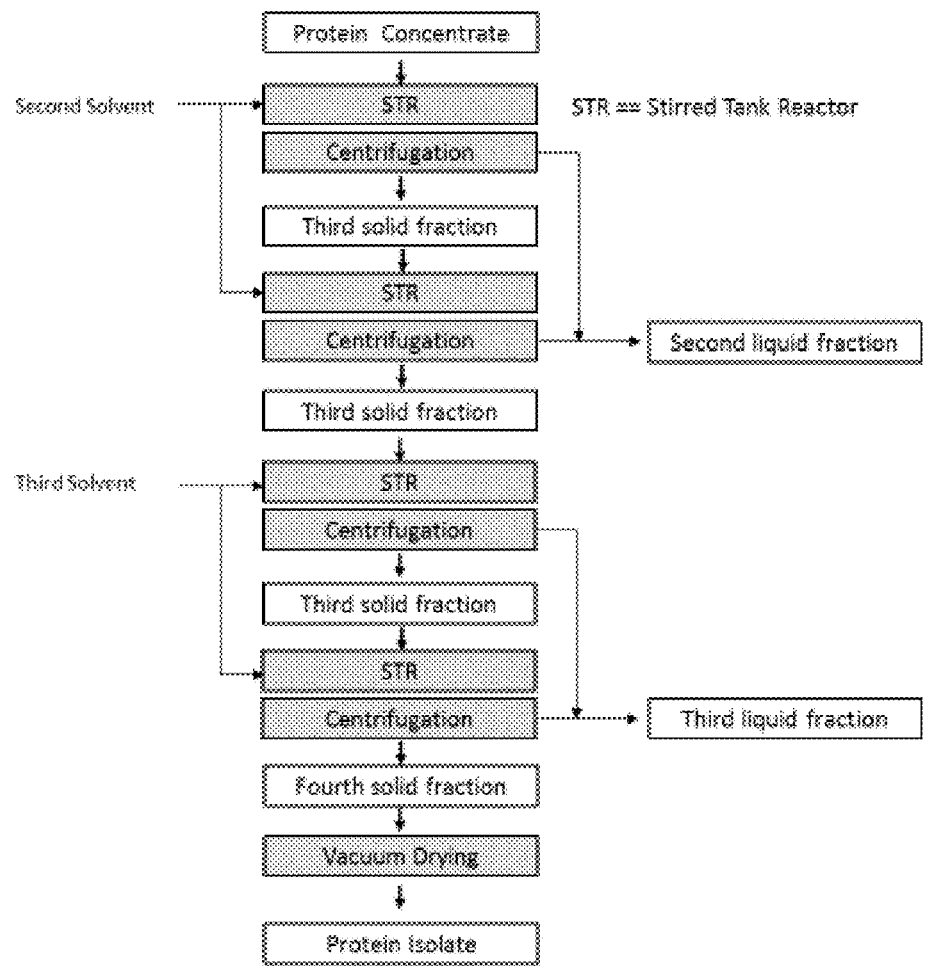
Figure 3A:
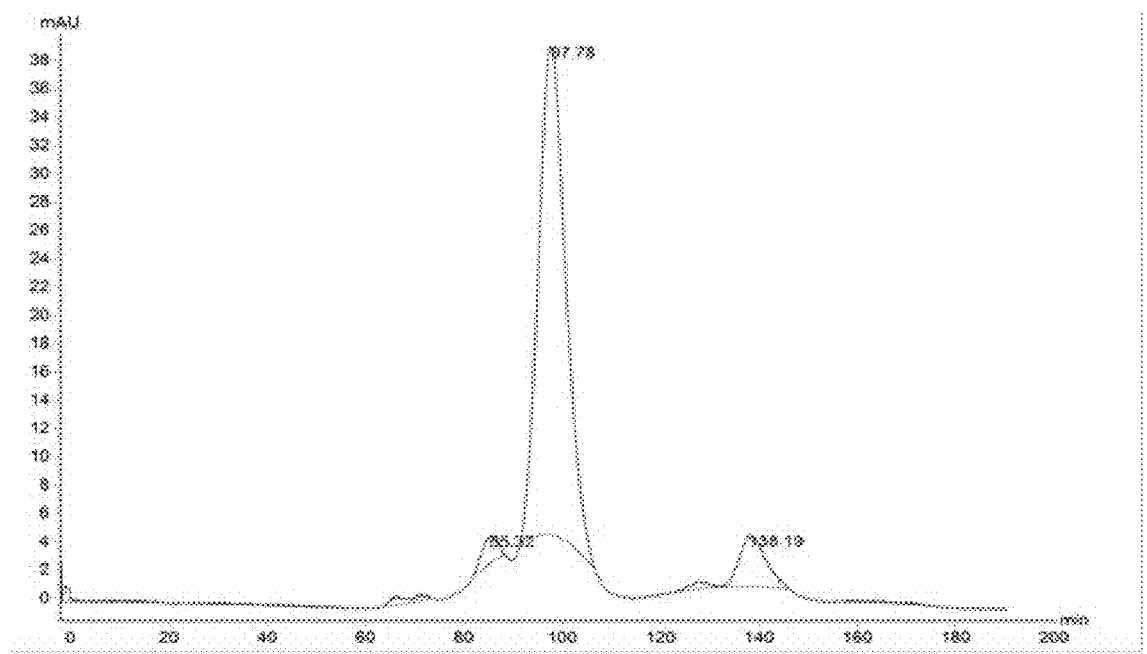
FIGS. 3a-3c respectively depict SEC Chromatograms corresponding to the protein isolates obtained in run 1a, 1b and 1c of the Examples.
Figure 3B:
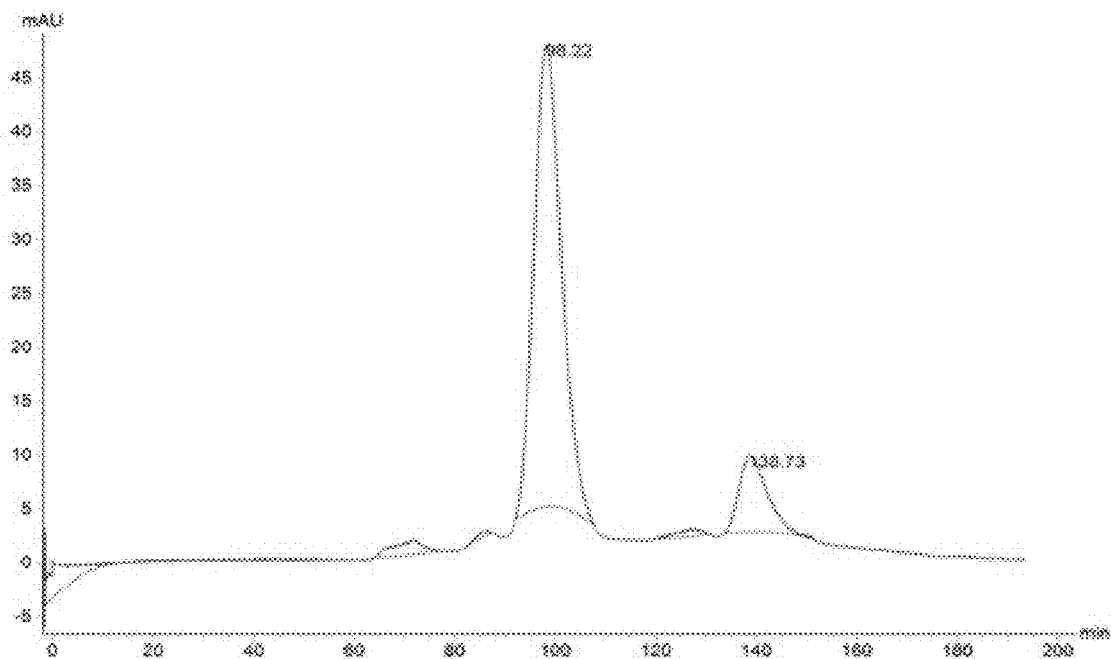
Figure 3C:
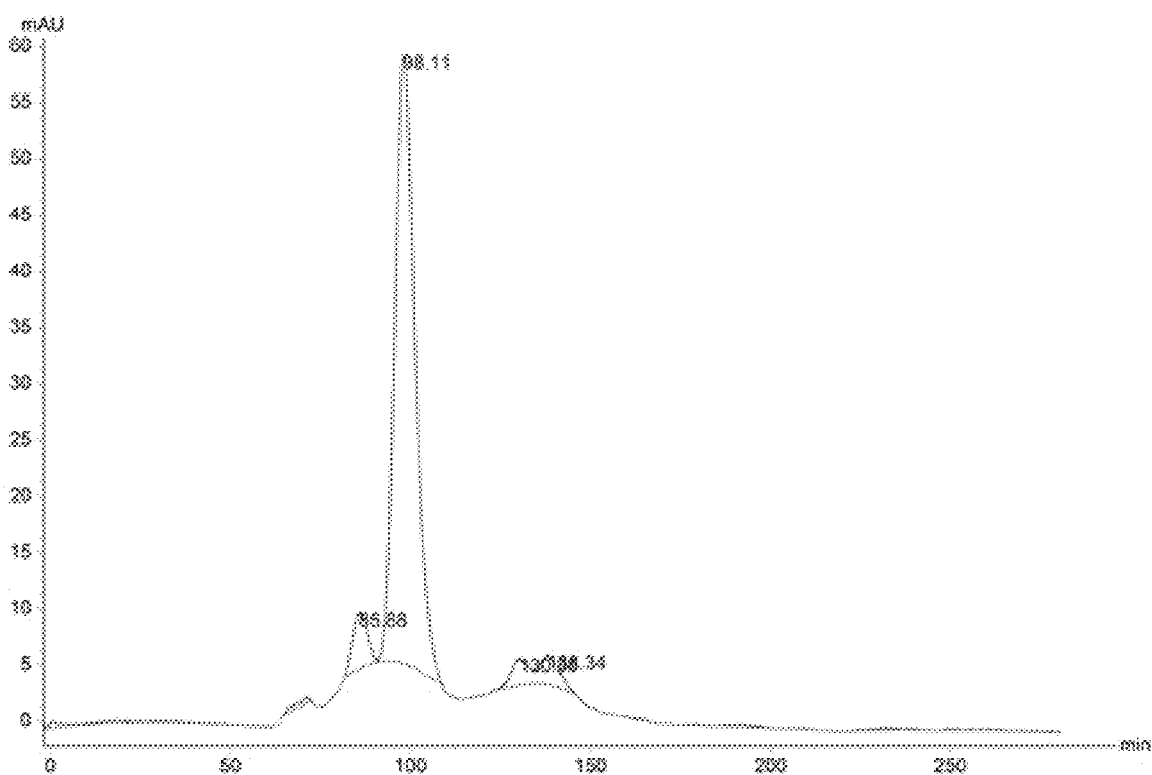

Runs 1a, 1b and 1c were performed as follows:

1. The rapeseed meal or cake was comminuted and sieved before every experiment in a grinder to generate a rapeseed solid cake having the required particle size (below 1000 μm). See Table 3 for characteristics of the rapeseed solid cake.
2. The thus pre-treated comminuted rapeseed solid cake was added to a first solvent, which was an aqueous salt solution (2 wt % NaCl and 0.1 wt % $Na_2SO_3$), and was gently homogenized using paddle to obtain a suspension. The weight ratio of the first solvent to the pre-treated comminuted rapeseed was 4 (see Table 1 for the exact amounts).
3. The suspension was loaded into an ALSEOS column, which was pre-charged with the first solvent up to 5% of its volume. When the entire working space of the column (column volume, CV) was filled, a flow of the first solvent over the column was started. A schematic drawing of the ALSEOS 7L system is given in FIG. 1. The working principles of ALSEOS are explained in WO2016/093698A2, which is herein incorporated by reference.
4. The flow of the first solvent to the ALSEOS device and the outflow of the Filtrate (=crude extract, =first liquid fraction) from the ALSEOS device were controlled by a peristaltic pump. The crude extract (first liquid fraction) was collected in a separate container. In total, about 23 L of crude extract was collected. See Table 1 for the exact amounts and process parameters. The pH during extraction was not regulated.
5. In a subsequent step, the crude extract was sampled and analyzed for dry matter content, total protein content and fat content. See Table 3 for characteristics of the crude extract.
6. Aliquots of the crude extracts obtained in step 4) were centrifuged (4000 g, 30 min, 10° C.) to separate residues of lipids, if present, as a top light phase, and residues of solid debris, present as a heavy pellet phase, from the clarified extract. After centrifugation, the clarified extract was present as an aqueous phase. See Table 3 for characteristics of the centrifuged clarified extract (first liquid fraction).
7. The clarified extract obtained in step 6) after centrifugation was loaded into a TFF (Tangential Flow Filtration) system in order to conduct an UF (Ultrafiltration) procedure (Polysulfone membrane, filter surface area: 0.042 $m^2$, cut off: 0.1 μm, cross TMP=1.5 bar), to yield a protein concentrate, which mainly contained cruciferin protein, and a UF permeate, containing a protein fraction capable of passing through the membrane. See Table 3 for characteristics of the UF protein concentrate (retentate) and the UF permeate.
8. The protein concentrate obtained in step 7) was subjected to a purification step with a second solvent, which was 96 vol % ethanol (supplied by Honeywell Specialty Chemicals Seelze GmbH) in a STR (volume 5 L, addition time 10-15 min under stirring, at a temperature between 2 and 8° C., followed by an incubation time of 10 min, under stirring with a magnetic stirrer). The second solvent was applied in an amount equal to 1.85 times the weight of the protein concentrate. The mixture was subsequently separated by centrifugation (4000 g, 30 min, 10° C.) to yield a third solid fraction (crude) and a third liquid fraction (crude).
9. The third solid fraction (crude) obtained in step 8) was subsequently subjected to an additional washing step using a mixture of the second solvent (70 vol % of the mixture) and water (30 vol % of the mixture) at a weight ratio of liquid to solid of 5:1 by adding the mixture of the second solvent and water to the third solid fraction in a STR (volume 5 L, addition time 10-15 min under stirring, at a temperature between 2 and 8° C., followed by an incubation time of 10 min, under stirring with a magnetic stirrer). The mixture was subsequently separated by centrifugation (4000 g, 30 min, 10° C.) to yield a washed third solid fraction and a third liquid fraction.
10. The washed third solid fraction obtained in step 9) was subsequently subjected to a purification step with a third solvent, which was ethyl acetate (CAS: 141-78-6, supplier: Stanlab J., purity grade: analytical reagent grade), conducted at a weight ratio of liquid to solid of 1:5, by adding the third solvent to the washed third solid fraction in a STR (volume 5 L, addition time 10-15 min under stirring, at a temperature between 2 and 8° C., followed by an incubation time of 10 min, under stirring with a magnetic stirrer). The mixture was subsequently separated by centrifugation (4000 g, 30 min, 10° C.) to yield a fourth solid fraction (crude) and a fourth liquid fraction (crude).
11. The fourth solid fraction (crude) obtained in step 10) was subsequently subjected to an additional washing step using the third solvent according to the procedure described in step 10). The mixture was subsequently separated by centrifugation (4000 g, 30 min, 10° C.) to yield a washed fourth solid fraction and a fourth liquid fraction.
12. The washed fourth solid fraction obtained in step 11) was subsequently dried on a tray in an oven at 40° C. overnight, milled with a pestle in a mortar and sieved to yield a protein isolate in powder form.
13. The protein isolate obtained in step 12) was analyzed for dry matter, protein, fat, carbohydrates (simple sugars), polyphenolic compounds and phytates contents (see Table 4). The protein isolate obtained in step 12) was also tested in terms of the functional properties such as nitrogen solubility and emulsifying activity (see Table 4). Furthermore, the amino acid composition in the protein isolate was assessed (see Table 5). Moreover, size exclusion chromatography was performed to assess the molecular size of the protein components present. FIGS. 3a, 3b and 3c, respectively, depict SEC chromatograms of the protein isolates obtained in runs 1a, 1b and 1c. Using SEC, high-molecular-weight polypeptide (Peak 1, ca. 100 min) was separated from low-molecular-weight polypeptide (Peak 2, ca. 140 min). High-molecular-weight polypeptide-containing protein cruciferin 140-150 kDa (7S) was eluted as a Peak 1 and residual napin (fraction: 26-28 kDa) as Peak 2. Closer examination of the structure, amino-acid composition and molecular size of the protein isolates indicates that the main protein component of the obtained protein isolate has molecular sizes of 148+/−10 kD, corresponding to classification 7S on the Svedberg scale, which indicates that the main protein component of the obtained protein isolate is a subunit of native cruciferin, which is a storage protein present in the brassicae family of plants, belonging to the class of globulin. A schematic drawing of the process is given in FIG. 2.

TABLE 1

Summary of process conditions and parameter settings in runs 1a-1c

| Run number | 1a | 1b | 1c |
|---|---|---|---|
| Process parameters and settings | | | |
| Source material | Rapeseed meal Self-prepared Low-temperature toasting | Rapeseed cake, cold-pressed | Rapeseed meal, Commercial High-temperature toasting |
| Particle size source material [µm] | <1000 | <1000 | <1000 |
| NaCl concentration (%) in first solvent (water) | 2 | 2 | 2 |
| $Na_2SO_3$ concentration (g/L) in first solvent (water) | 1 | 1 | 1 |
| Extraction temperature (° C.) | 15 | 15 | 15 |
| Extraction time (min) | 405 | 398 | 390 |
| Load source material (g) | 1386 | 1386 | 1386 |
| Amount of first solvent charged to ALSEOS with Source material (g) | 5544 | 5544 | 5544 |
| Flow rate of the filtrate = crude extract, out of ALSEOS [L/h] | 3.5 | 3.6 | 3.6 |
| Amount of the collected crude extract = first liquid fraction (L) | 23.5 | 23.6 | 23.2 |

TABLE 2

Rapeseed source materials - physicochemical characteristics

| Experiment number | 1a | 1b | 1c | Units |
|---|---|---|---|---|
| Rapeseed source material | Self-prepared low-temperature rapeseed meal | Rapeseed cake, cold-pressed | Commercial high-temperature rapeseed meal | — |
| Dry weight (DW) | 99.8 | 92.5 | 87.6 | % |
| Protein (Kjeldahl 6.25 × N) | 38.3 | 30.7 | 40.9 | % DW |
| Fat (Soxhlet method) | 1.8 | 20.0 | 4.7 | % DW |
| Carbohydrates (simple sugars) | 0.6 | 0.7 | 0.7 | % DW |
| Polyphenolic compounds | 0.6 | 0.4 | 0.5 | % DW |
| Phytates | 3.4 | 2.9 | 3.2 | % DW |
| NS % (Nitrogen Solubility) | 39.5 | 59.9 | 25.0 | % |

TABLE 3

Process steps and physicochemical characteristics of intermediates

| Step | Intermediate | Experiment number | 1a | 1b | 1c | Units |
|---|---|---|---|---|---|---|
| | Source material | Total amount | 1386 | 1386 | 1386 | G |
| Preparation | Rapeseed meal | Dry weight (DW) | 1383 | 1282 | 1214 | G |
| | | Protein (Kjeldahl) | 529 | 394 | 497 | G |
| | | Fat (Soxhlet method) | 24 | 256 | 57 | G |
| Extraction | Crude Extract | Total amount | 23466 | 23600 | 23200 | G |
| | | Dry weight (DW) | 947 | 899 | 754 | G |
| | | Protein (Kjeldahl) | 232 | 249 | 104 | G |
| | | Fat (Gerber's method) | 0 | 1.26 | 0 | G |
| | | Protein recovery in extraction step | 44 | 63 | 21 | % |
| Centrifugation | First Liquid Fraction | Total amount | 23320 | 23344 | 22919 | G |
| | | Dry weight (DW) | 960 | 891 | 718 | G |
| | | Protein (Kjeldahl) | 240 | 249 | 102 | g |
| | | Fat (Gerber) | 0 | 0.59 | 0 | g |

TABLE 3-continued

Process steps and physicochemical characteristics of intermediates

| Step | Intermediate | Experiment number | 1a | 1b | 1c | Units |
|---|---|---|---|---|---|---|
| UF | UF Concentrate (Protein Concentrate) | Total amount | 832 | 1101 | 489 | g |
| | | Dry weight (DW) | 71 | 166 | 62 | g |
| | | Protein (Kjeldahl) | 55 | 126 | 31 | g |
| | | Fat (Gerber's method) | 1.1 | 3.3 | 1.2 | g |
| | UF Permeate | Total amount | 22488 | 22243 | 22430 | g |
| | | Dry weight (DW) | 875 | 733 | 691 | g |
| | | Protein (Kjeldahl) | 177 | 123 | 72 | g |

TABLE 4

Protein isolates - physicochemical characteristics and functional properties.

| Run | 1a | 1b | 1c | Units |
|---|---|---|---|---|
| Dry weight (DW) | 89.8 | 90.0 | 89.3 | % |
| Protein (Kjeldahl 6.25 × N) | 101.3 | 95.5 | 97.0 | % DW |
| Fat (Soxhlet method) | 0.3 | 0.8 | 0.5 | % DW |
| Carbohydrates (simple sugars) | 0.6 | 0.6 | 0.8 | % DW |
| Polyphenolic compounds | 0.01 | 0.03 | 0.02 | % DW |
| Phytates | 0.2 | 3.0 | 0.1 | % DW |
| NS | 58.1 | 82.2 | 77.2 | % |
| EAI | 15.4 | 24.3 | 11.5 | $m^2/g$ |
| Ethyl acetate | <5 | <5 | <5 | ppm |

TABLE 5

Protein isolate - amino acids composition
Protein isolate (Run 1b)

| Compound | % Total |
|---|---|
| Aspartic acid + Aspargine | 9.97 |
| Threonine | 4.23 |
| Serine | 4.47 |
| Glutamic acid + Glutamine | 22.76 |
| Proline | 7.27 |
| Glycine | 5.38 |
| Alanine | 4.47 |
| Cysteine * | 0.64 |
| Valine | 5.13 |
| Methionine * | 1.46 |
| Isoleucine | 4.23 |
| Leucine | 8.09 |
| Tyrosine | 2.50 |
| Phenylalanine | 4.80 |
| Histidine **, *** | 2.50 |
| Lysine **, *** | 3.83 |
| Arginine **, *** | 7.36 |
| Tryptophan **, *** | 0.91 |
| Total: | 100.00 |

* sulfuric,
** alkaline,
*** exogenous,

TABLE 6

Key equipment used in Example 1

| Equipment | Type |
|---|---|
| ALSEOS 7 L | Prototype extraction system with the filter 100 um mesh size and 7 L working volume |
| Grinder | Philips hr2098/30 |
| Peristaltic pump (experiment 7-11) | Lead Fluid BT 300S + Y15 |
| pH-meter | Mettler Toledo Seven Compact, pH/Ion S 220 |
| conductivity meter | FiveGo ™ conductivity meter F3 Mettler Toledo |
| magnetic stirrer | IKA C-MAGHS 7 |
| Filtration systems | GE Healthcare, ÄKTA flux 6 |
| Centrifuge | Thermo Scientific Heraeus Multifuge X3 FR |
| Centrifuge | Hetticha 420R |

Conclusions

The rapeseed source materials used in runs 1a, 1b, and 1c differed in their NS %. The lowest NS % (25%) was obtained for the commercial rapeseed meal (run 1c), and the highest NS (59.9%) for rapeseed cake, cold-pressed (run 1b).

The values determined for NS % for the rapeseed source materials correspond with the protein recoveries obtained in the ALSEOS extraction unit; the lowest protein recovery for the extraction step (21.0%) was obtained for commercial rapeseed meal (run 1c), and the highest for rapeseed cake, cold-pressed (63%).

Fat content in all protein isolates was less than 1%.

Fat content in rapeseed cake, cold-pressed (run 1b), was 20% and in the protein isolate it was less than 1%, which demonstrates capacity of the process to efficiently remove fat without the use of harmful solvents, high temperatures and extreme shifts in pH and whilst retaining functional properties that are important in formulation of food applications, such as solubility in aqueous solutions and ability to form emulsions with oils and lipids.

Quality of the rapeseed source material had significant impact on the properties of the obtained protein isolates. The protein isolate with the highest NS % (82.2%) and EAI (24.3 $m^2/g$) was obtained in Run 1b, where source material was rapeseed cake, cold-pressed.

Example 2

Four runs (2a, 2b, 2c and 2d), wherein protein isolates were prepared from four different sources, were performed in accordance with the process of invention applying protocol described below.

In run 2a, raw (undefatted) soybeans were used. In run 2b, a rapeseed cake which was cold-pressed at a process temperature <70° C., obtained from Grupa Wilmar Marek Wilczyński SKA, was used. In run 2c, a commercial sunflower cake obtained from local market was used. In run 2d, raw red lentil seeds obtained from local market were used. In all abovementioned runs the plant materials were milled and sifted through 1 mm sieve.

Physicochemical characteristics of raw plant materials used in Example 2 are shown in Table 7. The process includes 7 main processes steps, as described below. Important parameters and process information regarding these steps are shown below.

1. Extraction
   a) Extraction medium: water, 2% NaCl, 0.1% $Na_2SO_3$
   b) Temperature: 15° C.
   c) pH of extraction: native
   d) Target volume of the extract. 14 kg (2CV)
   e) Target medium flow rate: 3.5 kg/h, adjustable if not attainable
   f) Extraction time: 4 h
2. Centrifugation
   a) Time 30 min
   b) Temperature 4° C.
   c) Relative centrifugal force 4000 G
3. UF/DF
   a) Cut-off membrane: 10 kDa
   b) Material Fiber: PS
   c) Membrane area: 0.12 $m^2$
   d) Fiber i.d. 1 mm, Cartridge Length 33 cm, Cat. No. GE UFP-10-E-5A
4. EtOH step 1
   a) 96% EtOH—1.85× amount of UF/DF concentrate (w/w)
   b) dosing time—10 min
   c) incubation time—10 min
5. EtOH step 2
   a) 70% EtOH—5× wet protein precipitate
   b) dosing time—10 min
   c) incubation time—10 min
6. EA step
   a) EA—ethyl acetate—5× wet protein precipitate after EtOH step 2
   b) dosing time—fast, one dose
   c) incubation time—30 min
7. Drying
   a) Time: 24-48 h
   b) Temperature: 50° C.
   c) Pressure in the vacuum dryer: 10 mbar A schematic drawing of the process is given in FIG. 2.

Summary of the most important process parameters as applied in Runs 2a-2d are given in Table. 8. Physicochemical and functional characteristics of Protein Isolates obtained in Experiment 2 are shown in Table 9.

TABLE 7

Physicochemical characteristics of raw plant materials used in Example 2

| | Experiment number | | | | |
| --- | --- | --- | --- | --- | --- |
| | 2a soybeans | 2b rapeseed cake | 2c sunflower cake | 2d red lentil seeds | Units |
| Total amount | 1386 | 1386 | 1386 | 1386 | g |
| Dry weight (DW) | 93 | 93 | 93 | 88 | % |
| Protein (Kjeldahl 6.25 × N ) | 40 | 32 | 32 | 28 | % DW |
| Fat (Soxhlet method) | 22 | 20 | 16 | 3 | % DW |
| Nitrogen Solubility | 25 | 53 | 36 | 50 | % |

TABLE 8

Summary of the experimental setpoints and process parameters for the process steps up to UF concentrate, prior to use of the second solvent.

|  | Raw plant material | | | |
| --- | --- | --- | --- | --- |
|  | soybeans Run 2a | rapeseed cake Run 2b | sunflower cake Run 2c | red lentil seeds Run 2d |
| Charge of the raw plant material into ALSEOS7 L column [g] | 1386 | 1386 | 1386 | 1386 |
| pH of the suspension (unadjusted) | 6.31 | 5.63 | 6.34 | 6.71 |
| Temperature [° C.] | 15 | 15 | 15 | 15 |
| extraction time [min] | 337 | 250 | 250 | 240 |
| amount of the crude extract collected [g] | 10562 | 14737 | 14190 | 14423 |
| pH of the crude extract (unadjusted) | 6.39-6.69 | 6.05-6.1 | 6.57-6.70 | 6.65-7.09 |
| amount of UF concentrate [g] | 2210 | 3545 | 4185 | 1905 |
| amount of UF/DF permeate [g] | 12510 | 18485 | 10015 | 20550 |
| amount of diawater in UF/DF step [g] | 4158 | 7293 | DF not performed | 8032 |

TABLE 9

Physicochemical and functional characteristics of Protein Isolates obtained in Experiment 2, Runs 2a-2d.

|  | Experiment number | | | | |
| --- | --- | --- | --- | --- | --- |
|  | 2a Protein Isolate from soybeans | 2b Protein Isolate from rapeseed cake | 2c Protein Isolate from sunflower cake | 2d Protein Isolate from red lentil seeds | Units |
| Internal sample nr | F-46#15 | F-47#15 | F-48#16 | F-49#15 |  |
| Total amount | 153 | 103 | 40 | 51 | g |
| Dry weight (DW) | 94.3 | 94.0 | 99.3 | 96.2 | % |
| Protein (Kjeldahl 6.25 × N) | 98.5 | 99.96 | 95.3 | 103.5 | % DW |
| Fat (Soxhlet method) | 1.6 | 1.16 | 0.45 | 0.29 | % DW |
| Phenolic compounds | 0.007 | 0.015 | 0.133 | 0.003 | % DW |
| Phytates | 0.21 | 2.16 | 1.25 | 0.07 | % DW |
| Nitrogen Solubility | 45.2 | 93.5 | 55.01 | 46.21 | % |
| EAI | 22.13 | 18.82 | 9.38 | 14.48 | $m^2/g$ |

TABLE 10

Key equipment used in Example 2.

| Equipment | Type |
| --- | --- |
| ALSEOS 7 L | Prototype extraction system with a filter 100 μm mesh size and 7 L working volume |
| Grinder | Philips hr2098/30 |
| Peristaltic pump | Lead Fluid BT 300S + Y15 |
| pH-meter | Mettler Toledo Seven Compact, pH/Ion S 220 |
| Conductivity meter | FiveGo ™ conductivity meter F3 Mettler Toledo |
| Magnetic stirrer | IKA C-MAGHS 7 |
| Filtration systems | GE Healthcare, ÄKTA flux 6 |
| Centrifuge | Thermo Scientific Heraeus Multifuge X3 FR |
| Centrifuge | Hetticha 420R |

Example 3

Aim of the Example 3 was to compare a process for obtaining rapeseed protein isolate as described in the prior art (WO2013/013949A1) with the process where the same intermediate (Protein Concentrate after UF/DF step) is processed according to the invention.

The starting material was Dehulled Rapeseed Cake (DRC) obtained from WILMAR GROUP Marek Wilczyński S.K.A. (batch number A-00 #27) with the characteristics presented in Table 11. Experimental conditions pertaining to Extraction step in the STR device are given in Table 12.

Figure 4:
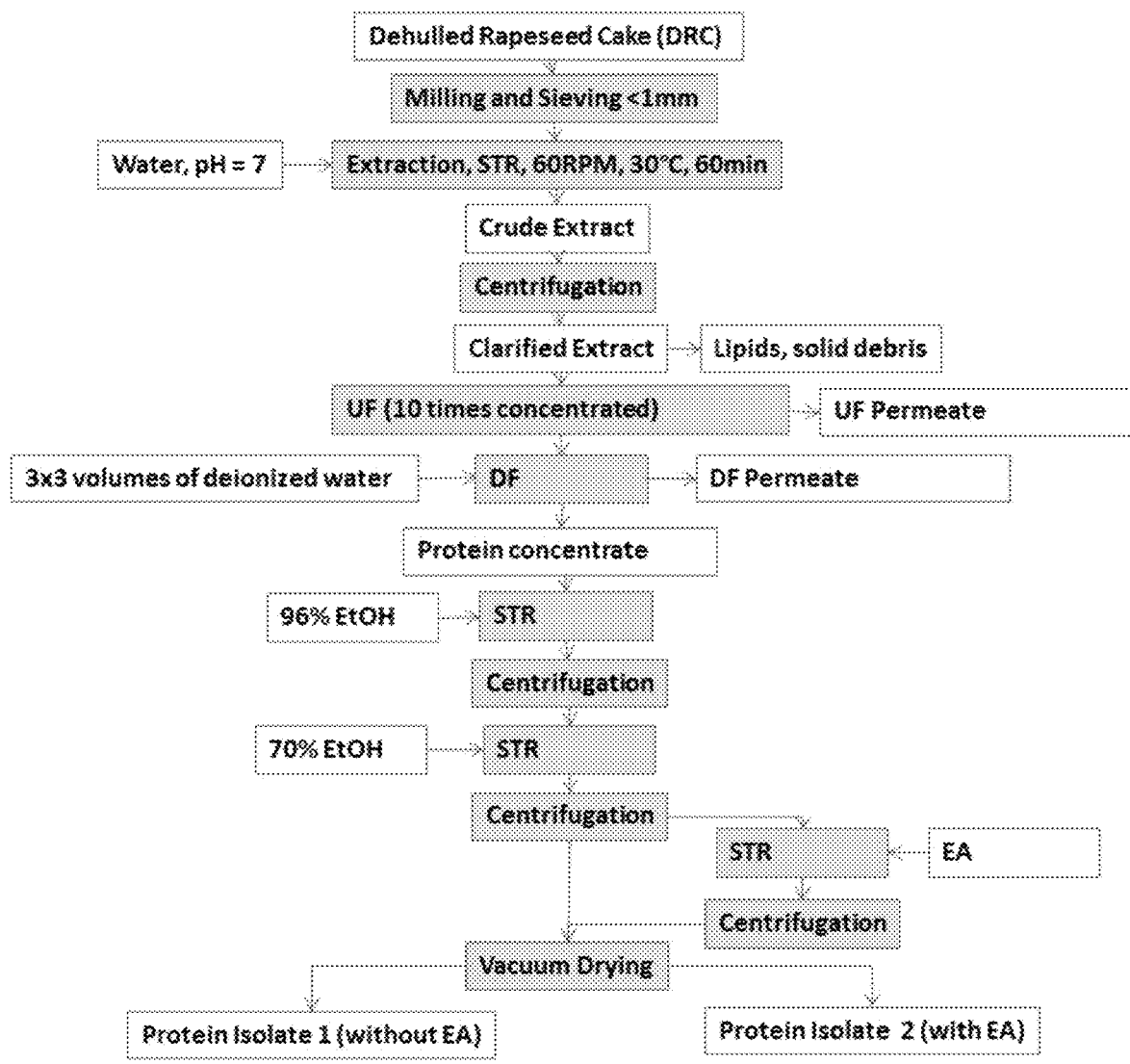
FIG. 4. Schematic of the process of invention as described in Example 3.

Schematics of the process applied in Example 3 are shown in FIG. 4.

Physicochemical characteristics of the Rapeseed Proteins Isolates obtained in Example 3 are shown in Table 13. Main equipment used in Example 3 is listed in Table 14.

Comparison of the fat content in the samples obtained in Example 3 shows clearly advantage of the process of invention where $3^{rd}$ solvent (Ethyl Acetate) is used, over the process described in prior art (WO2013/013949A1).

It is demonstrated that fat is effectively removed in the sample Rapeseed Protein Isolate 2 (0.22% DW) obtained in the process according to the invention, while the fat content is high (5.73% DW) in the Rapeseed Protein Isolate 1 obtained in the process as described in the prior art.

TABLE 11

Physicochemical and functional characteristics of Dehulled rapeseed cake (DRC) from GRUPA WILMAR Marek Wilczyhski S.K.A. used in Example 3.

| Methods | Data | Units |
|---|---|---|
| Dry weight (DW) | 96.85 | % |
| Protein (Kjeldahl 6.25 × N) | 30.40 | % DW |
| Fat (Soxhlet method) | 39.14 | % DW |
| Carbohydrates (simple sugars) | 8.90 | % DW |
| Polyphenolic compounds | 0.419 | % DW |
| Phytates | 2.56 | % DW |
| NS % (Nitrogen Solubility) | 38.1 (pH = 7.0, 150 mM NaCl) 19.5 (DEMI water, pH = native) | % |

TABLE 12

Summary of process conditions and parameter settings for the Extraction step

| Run number | 1 |
|---|---|
| Process parameters and settings | |
| Plant material | Dehulled Rapeseed Cake |
| Particle size source material [μm] | <1000 |
| Extraction temperature (° C.) | 30 |
| Speed of rotation (RPM) | 60 |
| Extraction time (min) | 60 |
| Load source material (g) | 2000 |
| Amount of first solvent - water (g) | 10000 |

TABLE 13

Physicochemical and functional characteristics of Rapeseed Protein Isolate 1 obtained according to the prior art (WO2013/013949A1) and Rapeseed Protein Isolate 2 (with EA == Ethyl Acetate used as third solvent)

| | Units | Protein Isolate 1 (without EA) | Protein Isolate 2 (with EA) |
|---|---|---|---|
| Protein content | % DW | 86.99 | 96.80 |
| Dry matter content | % | 97.50 | 97.53 |
| Phytate content | % DW | 2.21 | 2.36 |
| Fat content | % DW | 5.73 | 0.22 |
| Carbohydrate content (simple sugars) | % DW | 0.14 | 0.16 |
| Phenolic content | % DW | 0.052 | 0.057 |
| Ethyl acetate content | ppm | —* | <2.4 (<Limit of Quantitation) |
| Nitrogen solubility (NS %) | NS % | 79.17 | 86.72 |
| Emulsification activity index (EAI) | $m^2/g$ | 26.60 | 28.27 |

*not analyzed, EA not used in the process

TABLE 14

Key equipment used in Example 3

| Equipment | Type |
|---|---|
| STR | 30 L batch glass reactor equipped with IKA OHS Eurostar 60 stirrer |
| Grinder | Philips hr2098/30 |
| pH-meter, Conductivity meter | Mettler Toledo Seven Compact Duo S213 |
| Filtration systems | GE Healthcare, ÄKTA flux 6 |
| Centrifuge | Thermo Scientific Heraeus Multifuge X3 FR |

Description of the Analytical Methods Used in Examples

Methods Used to Characterize the Raw Plant Material and Protein Isolates

Protein Content

The protein content of the raw plant material and protein isolates was determined by the Kjeldahl method according to AOCS Official Method 991.20. A conversion factor of 6.25 was used to determine the amount of protein (wt %).

Dry Matter Content

A sample (2.0±0.5 g for raw plant material, 1.0±0.5 g for protein isolates) of the raw plant material was placed in a moisture analyzer at a temperature of 105° C. The moisture content was determined from the difference in the sample weight before and after drying.

Fat Content

The fat content was determined according to the Weibull-Stoldt Method. A sample (raw plant material and protein isolates) was hydrolyzed with solution 10% (v/v) HCl and heated to 300° C. using an infrared heating system. The hydrolyzed sample was extracted with petroleum ether in the Extraction System.

The fat content (X) was calculated as wt % according to the formula:

$$X = \frac{a-b}{c} \times 100\%$$

wherein:
a is the mass of the glass sample tube with the sample fat after drying (g);
b is the mass of the glass sample tube after drying (g); and
c is the mass of the sample (g).

Phenolic Content

The content of phenolic compounds was determined by the Folin-Ciocialteu method, as described by Siger et al. Oilseed Crops, 2004, XXV, pp 263-274. Absorbance was measured at λ 725 nm Phytate Content The phytate content analysis was done in accordance to the phytic acid (phytate)/total phosphorus assay procedure K-PHYTY 08/14 by Phytic Acid (Total Phosphorous) Assay Kit Megazyme.

Carbohydrate Content

The carbohydrate (simple sugars) concentration was determined by the chemical reaction of reducing sugars and 3,5-dinitrosalicylic acid (DNS) in an alkaline and high-temperature medium to a colored product as described by G. L. Miller, *Analytical Chemistry*, 1959, 31, pp 426-428. The intensity of the red-brown colour was measured spectrophotometrically at λ 540 nm. The actual carbohydrate content was derived from a calibration curve with a glucose as standard.

Nitrogen Solubility (NS %)

A protein solution was prepared by dissolving raw plant material at a sample (concentration of 2 wt % for plant material, 1 wt % for protein isolates) in 150 mM NaCl and the pH was adjusted to 7.0 with 0.1 M HCl or with 0.1M NaOH. The resulting solution was incubated for 1 hour at 22° C. while vigorously shaking. Subsequently, samples were centrifuged at 4000 g for 30 minutes and the resulting supernatant was collected. The soluble protein content of the supernatant and the soluble protein in plant material were analyzed by the Kjeldahl method (×6.25). The Nitrogen solubility (NS %) was defined as:

$$NS\ \% = \frac{\text{amount of soluble protein}}{\text{total amount of protein}} \times 100$$

Emulsification Activity Index (EAI) and Emulsification Stability Index (ESI)

A protein solution was prepared by dissolving protein isolate (concentration of 0.25 wt %) in 150 mM NaCl in a sample tube. The pH of the resulting solution was adjusted to 7.0 with 0.1 M HCl or 0.1 M NaOH. 5 g of the protein solution was shaken for 1 hour at 450 rpm. Subsequently, the solution was homogenized with 5 g rapeseed oil at 6000 g for 5 min resulting in an emulsion. 50 μl of the emulsion were immediately taken from the sample tube and diluted in 7.5 mL of 0.1% SDS, followed by vortexing. Then, the absorbance of the dilution at λ 500 nm was determined using a spectrophotometer. After 10 minutes, the absorbance measurement was repeated.

EAI (m²/g) and ESI (min) were defined as:

$$EAI\left(\frac{m^2}{g}\right) = \frac{2*2.303*A_0*N}{c*\varphi*10000}$$

$$ESI(\min) = \frac{A_0}{\Delta A}*t$$

wherein
$A_0$ is the absorbance of the diluted emulsion immediately after homogenization;
$\Delta A$ is the difference in absorbance between 0 and 10 min ($A_0$-$A_{10}$);
t is the time interval (10 min);
c is the weight of protein per volume [g/ml];
φ is the oil volume fraction of the emulsion; and
N is the dilution factor.

Amino Acids Analysis

Amino acids analysis of the protein isolate was performed by three different hydrolysis procedures:
1. Acidic hydrolysis of proteins in order to determine the amino acid composition without oxidation, conducted according to the method described in M. G. Davis and A. J. Thomas, *J. Agric. Food Agric.*, 1973, 24, page 1525.
2. Protein hydrolysis to separate sulfuric amino acids, conducted according to the method described in E. Schram, S. Moore, E. J. Bigwood, *Biochem. J.*, 1954, 57(1), pp 33-37.
3. Alkaline hydrolysis to determinate the tryptophan content, conducted according to the method described in P. Sławiński, K. Tyczkowska, *Roczn. Technol. i Chemii Żywn.*, 1974.

Amino acids were separated by ion exchange chromatography. The column was heated to 60° C. and 74° C. in a sequence. The apparatus identified ninhydrine derivatized amino acids by photometric detection at a wavelength of 440 nm (for proline) and at 570 nm (for all of the others).

After amino acid separation, the column was regenerated with 0.2M NaOH.

Size Exclusion Chromatography

Protein isolates were characterized by Size Exclusion Chromatography, with standard protein (43000 to 669000 Da) as a reference. Protein isolate samples were dissolved in the eluent 50 mM Tris-HCl, pH=7.5, 1M NaCl. Separation was performed on an AKTA avant SEC, Superdex 200 Å, 175 mL, 16 mm/100 cm column, at 25° C., using isocratic elution and a flow rate of 1.0 ml/min. Detection of the protein peaks was performed using UV absorption at 220 and 280 nm.

Ethyl Acetate Content

A sample was prepared by extraction with hexane followed by Gas Chromatography with a Flame-ionization Detector (GC-FID) analysis. Chromatographic separation was performed using capillary column Stabilwax-DA, 30 m×0.25 mm×0.25 μm) and was used injector S/SL. The detector and injector temperatures were 250 and 200° C., respectively, injection volume 1 μL, helium flow at 1 mL/min. The oven temperature was maintained at 30° C. for 5 min then programmed to a final temperature of 115° C. which was held for 2 min. Hydrogen was used as carrier gas at a flow rate of 40 mL/min, and synthetic air flow rate was 280 mL/min, the split ratio was 1:25.

Ethanol Content

A sample was prepared by extraction with deionized water followed by Gas Chromatography with a Flame-ionization Detector (GC-FID) analysis. Chromatographic separation was performed using capillary column Stabilwax-DA, 30 m×0.25 mm×0.25 μm), and was used injector PTV. The detector and injector temperatures were 250 and 200° C., respectively, injection volume 0.5 helium flow at 1 mL/min. The oven temperature was maintained at 70° C. for 4 min then programmed to a final temperature of 230° C. which was held for 15 min. Hydrogen was used as carrier gas at a flow rate of 40 mL/min, and synthetic air flow rate was 280 mL/min, the split ratio was 1:20.

Methods Used to Characterize Crude Extract (First Liquid Fraction, Obtained in Step b))

Protein Content

The protein content of the first liquid fraction was determined by the Kjeldahl method according to AOAC Official Method 991.20 (2005). A conversion factor of 6.25 was used to determine the amount of protein (wt %).

Dry Matter Content

A sample (2.0±0.5 g) of the first liquid fraction was placed in a moisture analyzer at a temperature of 105° C. The moisture content was determined from the difference in the sample weight before and after drying.

Fat Content

The fat content of the first liquid fraction was determined by the Gerber method according to PN-ISO 2446:2010.

The invention claimed is:

1. A process for the preparation of a protein isolate from plant material, wherein said plant material comprises between 10 and 50 wt. % on dry weight basis of proteins, said process comprising the steps of:
   a) crushing or comminuting the plant material to produce a solid cake;
   b) extracting the solid cake obtained in step a) using a first solvent comprising at least 90 wt. % of water, based on the total weight of the first solvent, to obtain a mixture of a first solid fraction and a first liquid fraction;
   c) separating the first liquid fraction from the first solid fraction;
   d) preparing a concentrated protein mixture from the first liquid fraction obtained in step c), wherein the concentrated protein mixture comprises 50 to 90 wt. % of water, wherein protein is dissolved in the first solvent and/or wherein protein is present in a second solid fraction, wherein the protein content in the concentrated protein mixture is at least 40 wt. %, based on total dry weight of the concentrated protein mixture;
   e) adding a second solvent to the concentrated protein mixture obtained in step d), wherein the second solvent comprises at least 90 wt. % of an alcohol having 1 to 5 carbon atoms which is miscible with water at room temperature;
   f) separating the mixture obtained in step e) into a second liquid fraction and a third solid fraction using a technique selected from the group consisting of filtration, sedimentation, centrifugation and combinations thereof, wherein the protein content of the third solid fraction is at least 60 wt. %;
   g) adding a third solvent to the third solid fraction obtained in step f), said third solvent comprising at least 90 wt. % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is chosen such that the overall liquid phase does not separate into distinct liquid phases;
   h) separating the mixture obtained in step g) into a third liquid fraction and a fourth solid fraction using a technique selected from the group consisting of filtration, sedimentation, centrifugation and combinations thereof, wherein the protein content of the fourth solid fraction is at least 90 wt. %;
   i) subjecting the fourth solid fraction obtained in step h) to a technique selected from the group consisting of vacuum drying, spray drying, superheated steam drying and combinations thereof to obtain a protein isolate wherein the protein content is at least 90 wt. %.

2. Process according to claim 1, wherein the plant material is at least partially defatted prior to step a) using mechanical means.

3. Process according to claim 2, wherein neither organic nor mineral solvents are used in the defatting step using mechanical means.

4. Process according to claim 1, wherein the plant material comprises at least 5 wt. %, on dry weight basis of fats, oils and lipids.

5. Process according to claim 1, wherein the extraction in step b) is performed under low-shear conditions.

6. Process according to claim 1, wherein between steps b) and c), at least part of the fats, oils and lipids present in the mixture of the first solid fraction and the first liquid fraction obtained in step b) is removed.

7. Process according to claim 1, wherein the separation of the first liquid fraction from the first solid fraction in step c) is performed using a technique selected from the group consisting of centrifugation, filtration and combinations thereof.

8. Process according to claim 1, wherein in step d) the first liquid fraction is subjected to one or more diafiltration steps to remove at least part of the non-protein components and/or wherein the first liquid fraction is subjected to an evaporation step.

9. Process according to claim 1, wherein the first solvent in step b) is water or an aqueous solution comprising salts and optionally comprising further additives.

10. Process according to claim 1, wherein the alcohol having 1 to 5 carbon atoms which is miscible with water at room temperature is selected from the group consisting of methanol, ethanol, propanol, iso-propanol, butanol, iso-butanol, and combinations thereof.

11. Process according to claim 10, wherein the alcohol having 1 to 5 carbon atoms which is miscible with water at room temperature is ethanol.

12. Process according to claim 1, wherein the weight ratio of the first solvent used in step b) to the second solvent used in step e) is between 1:10 and 1:1.

13. Process according to claim 1, wherein the apolar and lipophilic organic ester having up to 5 carbon atoms in the third solvent used in step g) is ethyl acetate.

14. Process according to claim 1, which is performed without using organic or mineral solvents having 6 or more carbon atoms, such as hexane.

15. Process according to claim 1, which is performed at a temperature between 0 and 50° C.

16. Process according to claim 1, which is performed at a pH between 5 and 8.

17. Process according to claim 1, wherein the third solid fraction after step f) and before step g) is subjected to an additional washing step using a mixture of second solvent and first solvent followed by a solid-liquid separation step.

18. Process according to claim 1, wherein the fourth solid fraction after step h) and before step i) is subjected to an additional washing step using the third solvent followed by a solid-liquid separation step.

19. Process according to claim 1, wherein the plant material is selected from the group consisting of vegetables, fruits, seeds, legumes, grains and combinations thereof.

20. Process according to claim 1, wherein the plant material is selected from the group consisting of oilseeds, including rapeseed, canola, sunflower, safflower, and cottonseed, pulses, including soybeans and other beans, legumes and peas, including chickpea, red, green, yellow and brown lentils, and combinations thereof.

21. Process according to claim 19, wherein the plant material is selected from the group consisting of oilseeds including rapeseed, canola, sunflower seed, flaxseed, safflower seed, cottonseed, and combinations thereof, wherein the plant material.

22. Process according to claim 1, wherein the protein isolate comprises at least 95 wt. % of plant-based protein based on dry matter.

23. Process according to claim 1, wherein the protein isolate comprises at least 70 wt. % of native plant-based protein based on dry matter.

24. Process according to claim 1, wherein the plant material is raw plant material.

25. Process according to claim 4, wherein the plant material comprises at least 10 wt. %, on dry weight basis of fats, oils and lipids.

* * * * *